US010201125B2

(12) United States Patent
Cook

(10) Patent No.: US 10,201,125 B2
(45) Date of Patent: Feb. 12, 2019

(54) COMBINED CENTER CAM AND REEL ARM

(71) Applicant: CNH INDUSTRIAL AMERICA, LLC, New Holland, PA (US)

(72) Inventor: Joel Timothy Cook, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 714 days.

(21) Appl. No.: 14/479,195

(22) Filed: Sep. 5, 2014

(65) Prior Publication Data

US 2016/0066510 A1    Mar. 10, 2016

(51) Int. Cl.
*A01D 57/04*    (2006.01)
*A01D 57/02*    (2006.01)

(52) U.S. Cl.
CPC .................. *A01D 57/02* (2013.01)

(58) Field of Classification Search
CPC ......... A01D 57/02; A01D 57/03; A01D 57/04
USPC .................. 56/14.4, 220–222, 364
See application file for complete search history.

(56) References Cited

U.S. PATENT DOCUMENTS

| | | | |
|---|---|---|---|
| 4,297,833 A * | 11/1981 | Gaeddert | A01D 89/002 56/364 |
| 6,442,918 B1 | 9/2002 | Fox | |
| 6,591,598 B2 | 7/2003 | Remillard et al. | |
| 6,651,411 B1 * | 11/2003 | Becker | A01D 57/04 56/10.2 A |
| 6,675,568 B2 | 1/2004 | Patterson et al. | |
| 7,222,479 B2 | 5/2007 | Stahl et al. | |
| 7,426,817 B2 | 9/2008 | Coers | |
| 7,805,921 B2 | 10/2010 | Coers et al. | |
| 7,866,132 B2 * | 1/2011 | Killen | A01D 57/04 56/10.2 E |
| 8,176,716 B2 | 5/2012 | Coers et al. | |
| 8,590,284 B2 * | 11/2013 | Rayfield | A01D 75/18 56/226 |
| 8,863,489 B2 * | 10/2014 | Landon | A01D 57/28 56/192 |
| 2002/0148210 A1 | 10/2002 | Bickel | |
| 2003/0213222 A1 * | 11/2003 | Arbuckle | A01D 45/30 56/328.1 |
| 2007/0204583 A1 * | 9/2007 | Coers | A01D 61/002 56/14.4 |
| 2007/0289278 A1 * | 12/2007 | Coers | A01D 41/141 56/14.4 |
| 2012/0047867 A1 * | 3/2012 | Coers | A01D 57/02 56/220 |

(Continued)

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

An integrated reel arm and reel cam for use in an agricultural harvesting header that positions both within the same lateral space in order to reduce the width of the integrated assembly. The reel arm connects directly to a rearwardly facing structure on the reel cam and may include adjustment means for varying cam timing. The lateral width of the reel arm and connection is configured to be no greater than the lateral width of the reel cam thereby enabling positioning of a reel cam between adjacent reels in little more than the lateral width of the cam itself. The integrated reel arm and reel cam may also benefit conventional outboard reel cam configurations by reducing the lateral space requirements at the ends of a header reel.

17 Claims, 4 Drawing Sheets

(56) References Cited

U.S. PATENT DOCUMENTS

2012/0304611 A1* 12/2012 Rayfield ................ A01D 75/18
  56/226
2013/0160418 A1*  6/2013 Sauerwein ............. A01D 57/02
  56/220

* cited by examiner

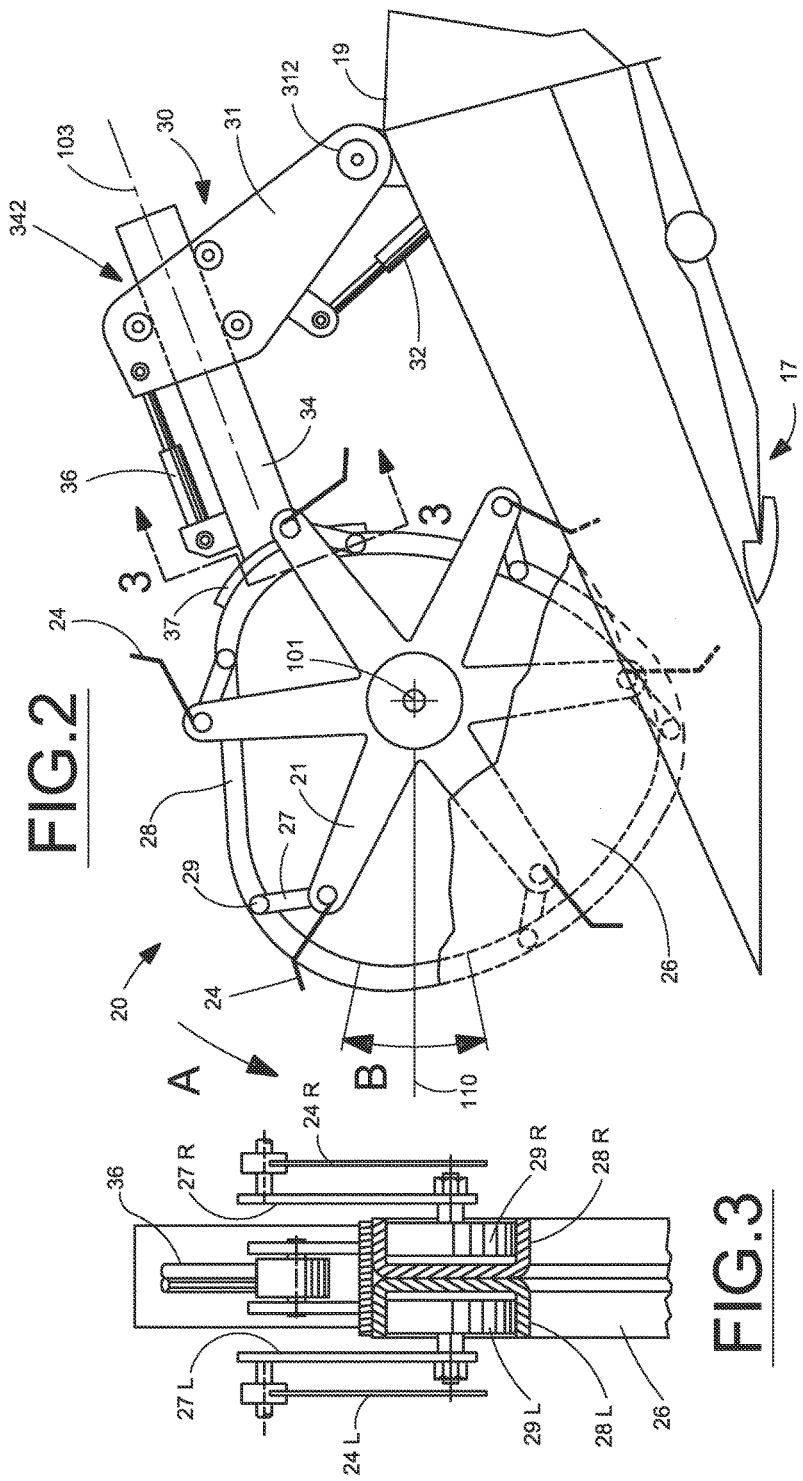

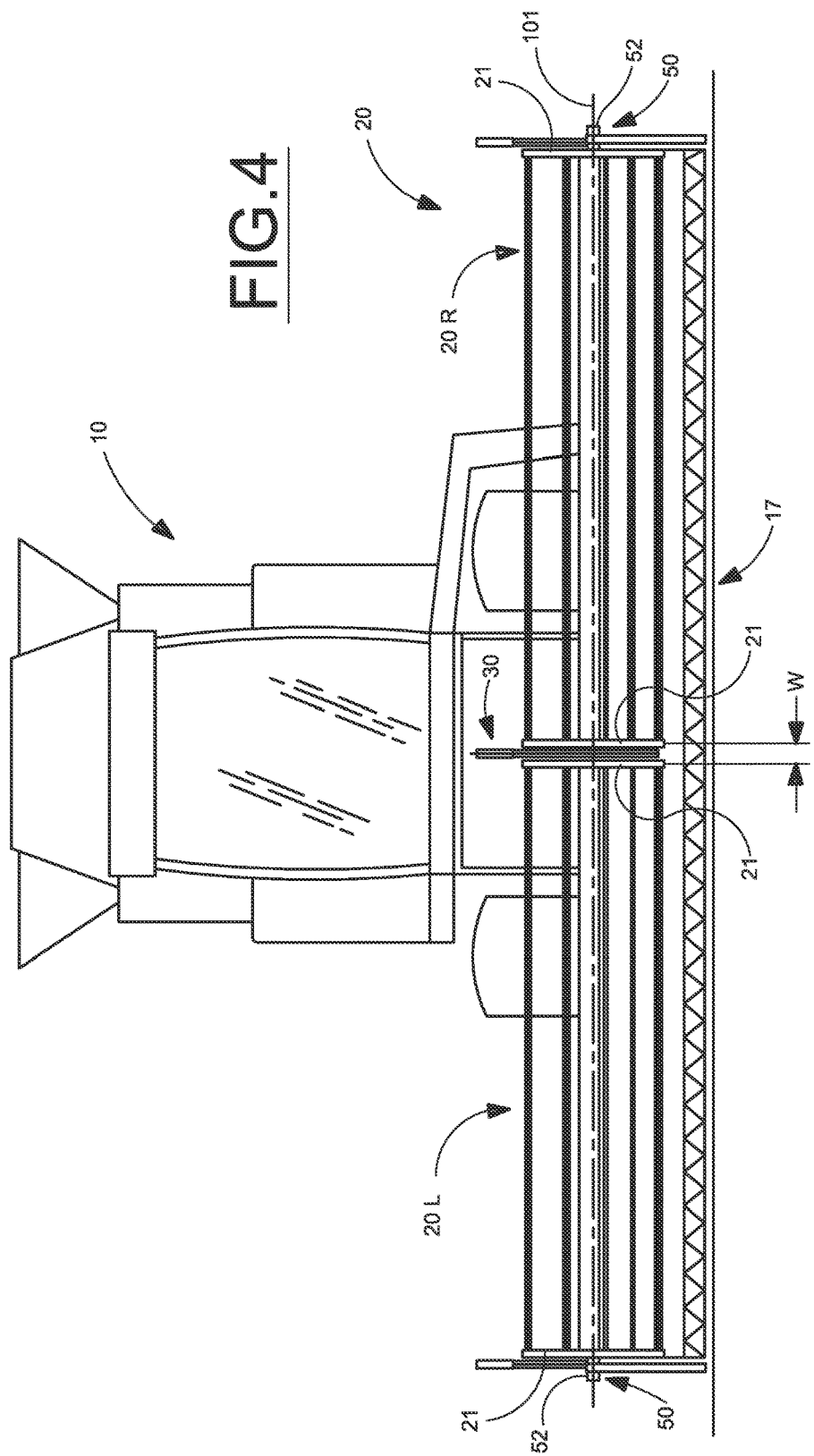

COMBINED CENTER CAM AND REEL ARM

BACKGROUND OF THE INVENTION

The present invention relates generally to agricultural harvesting machines having crop harvesting headers, such as combines, and, more particularly to harvesting machines having a reel positioned above a cutting mechanism for assisting in feeding of crop material through the harvesting header.

Many harvesting headers employ a rotary reel to assist with crop movement into the cutting mechanism. The reel, including a plurality of tine bars having axially spaced tines therealong, guides the crop material to be harvested towards a cutter bar extending between header sidewalls, and the cut crop is transported on a draper or auger transport arrangement into the harvester for further processing. The tine bars are mounted for pivotal movement about a respective tine bar axis generally parallel to a reel rotational axis. A cam, typically mounted between the sidewall and an end of the rotary reel, in cooperation with linkages to each tine bar, controls the pivotal movement of the tine bars and thus the angular orientation of the tines thereon. As the rotary reel rotates, the tines on each tine bar follow a predetermined path defined by the cam for lifting, separating, and guiding crop material towards the cutter bar and beyond. The reel may also be supported by a plurality of reel arms which enable adjustment of the position of the reel in relation to the cutterbar. The reel position may be adjusted vertically and/or in a fore-aft direction to provide optimal movement of the crop material.

Experience with some crop harvesting headers shows that certain crops are prone to improper flow near the outboard ends of the crop reel due to interaction with the cam and the reel arm. One solution to the problem is to shift the lateral position of the reel arm to a position outboard of the header sidewall so that the reel end and cam may be positioned as close as possible to the sidewall. This design generally increases the lateral width of the sidewall increases crop knock down (waste) as the sidewall width increases. An alternative design splits the reel into two or more portions and relocates the cams and a supporting reel arm to an inboard position between adjacent reel portions. Such a design requires two cams (one for each reel portion) and supporting structure needed to connect the cams to a reel arm. The resulting structure creates a dead zone in the reel width (gap between adjacent reel portions) of approximately 8 inches and effectively relocates the crop flow problems from the outboard ends of the reel to the center cam location.

It would be a great advantage to provide reel arm with an integral reel cam for a crop harvesting header having a narrow lateral profile allowing placement of the cam between the outboard reel ends without adversely affecting crop movement into the header. Additional advantages would be realized by an integral reel arm and reel cam that is compatible with existing reel arm lifting and reach adjustment mechanisms installed on the header. Further advantages would be realized by an integral reel arm and reel cam that could also be positioned on the outboard ends of the reel to reduce the width of the non-crop processing portion of the header ends.

SUMMARY OF THE INVENTION

Accordingly, the present invention, in any of the embodiments described herein, may provide one or more of the following advantages:

It is an object of the present invention to provide an integrated reel arm and reel cam for use in an agricultural harvesting header that positions both within the same lateral space in order to reduce the width of the integrated assembly. The reduced width reel arm and cam may be positioned at an intermediate position long the reel width or it may be positioned at one or both outboard ends where the reduced width enables the non-cutting width of the header to be reduced.

It is a further object of the present invention to provide an integrated reel arm and reel cam for use in an agricultural harvesting header that is compatible with the vertical and fore-aft reel adjusting mechanisms on current header designs by the Applicant. A reel arm is connected to a reel cam in a manner minimizing the width of the integral assembly. An end of the reel arm distal to the reel cam is configured to attach to a reel arm position adjusting mechanism on the header thereby enabling the narrow profile reel cam to be position adjusted as is possible on Applicant's current production headers.

It is a further object of the present invention to provide an integrated reel arm and reel cam for use in an agricultural harvesting header that enables adjustment of the cam timing. The connection between the reel arm and the reel cam may include a bolted connection with slotted holes on the arm or the cam to allow limited movement of one relative to the other so that the cam may be rotated slightly about the reel axis thereby enabling adjustment of cam timing.

It is a still further object of the present invention to provide an integrated reel arm and reel cam for use in an agricultural harvesting header that is durable in construction, inexpensive of manufacture, carefree of maintenance, easily assembled, and simple and effective to use.

These and other objects are achieved by providing an integrated reel arm and reel cam for use in an agricultural harvesting header that positions both within the same lateral space in order to reduce the width of the integrated assembly. The reel arm connects directly to a rearwardly facing structure on the reel cam and may include adjustment means for varying cam timing. The lateral width of the reel arm and connection is configured to be no greater than the lateral width of the reel cam thereby enabling positioning of a reel cam between adjacent reels in little more than the lateral width of the cam itself. The integrated reel arm and reel cam may also benefit conventional outboard reel cam configurations by reducing the lateral space requirements at the ends of a header reel.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a partial side view of the header of FIG. 1 showing the cam and reel arm plan location in one embodiment of the present invention;

FIG. 3 is a section view taken along cut line 3-3 in FIG. 2;

FIG. 4 is a front view of the harvesting machine of FIG. 1; and

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
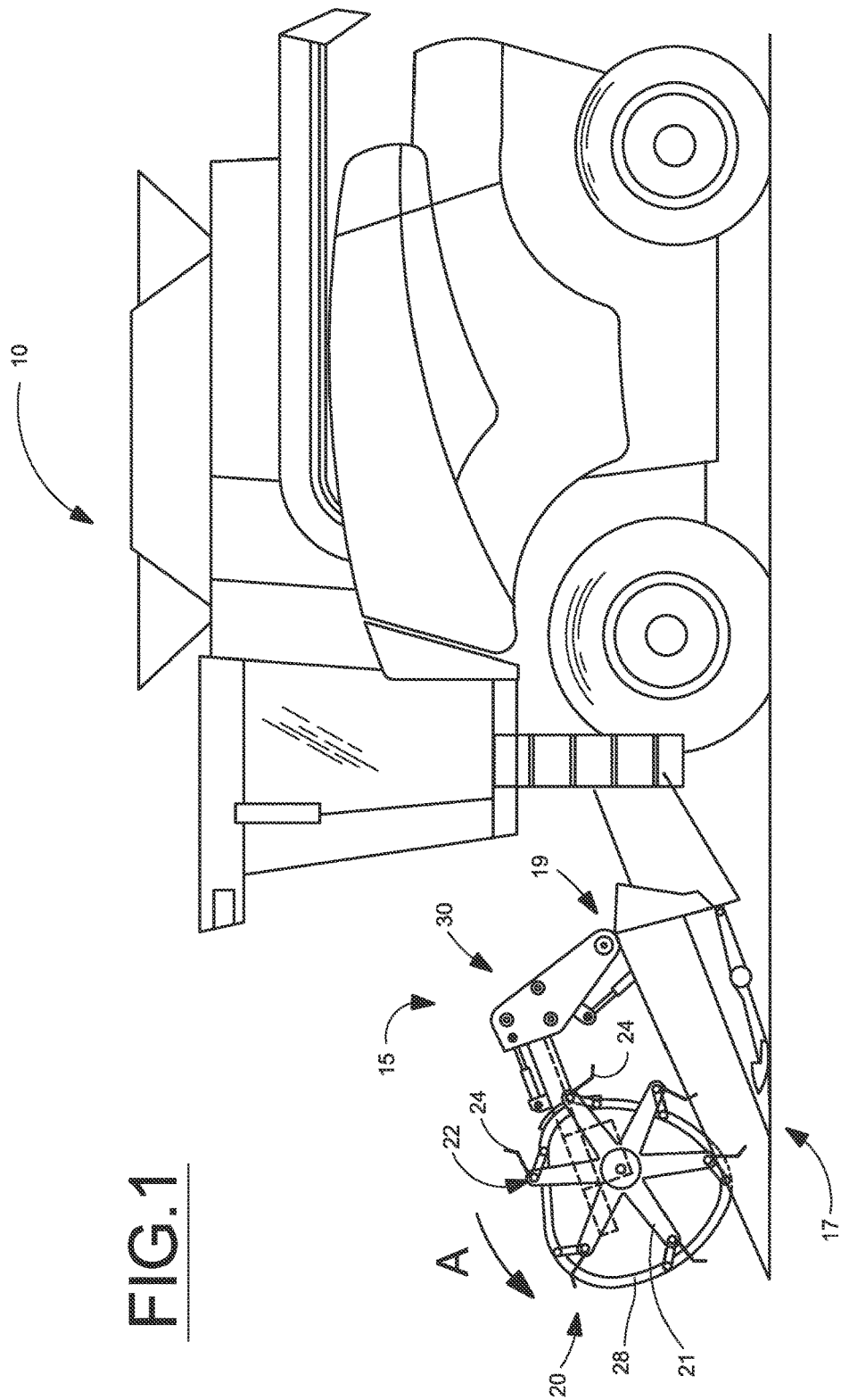
FIG. 1 is a side view of an agricultural harvesting machine, which is a combine, including a header on which the present invention is useful.

Referring to the figures, FIG. 1 illustrates a conventional agricultural harvester, a combine 10 in this instance, having a forwardly mounted header 15 for processing a standing crop as the harvester moves across a field. The header 15 is transversely arranged on the harvester and includes a laterally extending cutterbar 17 for severing the standing crop from the ground. A transversely arranged tine reel 20 is also provided and positioned generally parallel to and above the cutterbar to guide the standing crop into the header and toward the cutterbar. The header 15 is vertically moveable in relation to the harvester so that the header may float over irregularities in the ground and maintain the cutterbar 17 in a desired proximity to the ground. Systems controlling header float are well known in the art and are not discussed further herein.

It is also known to provide a means to vary the position of the tine reel 20 in relation to the cutterbar 17 and header structure 19. Mechanisms capable of repositioning the tine reel 20 vertically as well as in a fore-aft direction may be provided. Such mechanisms typically include moveable arms positioned at each end of the tine reel with a bearing disposed on each arm rotatably supporting an axle 52 on which the tine reel rotates.

The tine reel 20 comprises at least a pair of spaced apart reel spiders 21 engaged on the axle being supported at each end by outboard supports 50 for rotation about a reel axis 101. The spiders 21 in turn support a plurality of pivotally moveable tine bars 22 which orbital about reel axis 101 as the spiders 21 rotate about the reel axis. Additional spiders may be intermediately positioned between the outboard spiders for additional tine bar support in wider reels.

To each tine bar 22 is connected a plurality of tines 24, the angle of the tines being varied by pivotal movement of the tine bars 22 to angularly orient the connected tines 24 for most effective crop movement as the reel 20 rotates. Pivotal position of the tine bars 22 is managed by one or more cams 28 disposed on a cam support structure 26. Each tine bar includes a follower 29 interacting with one of the cams 28 and connected by a linkage 27 to the tine bar 22. As the reel rotates (arrow A in FIGS. 1 and 2), the followers 29 travel along cam 28 and vary the pivotal position of each tine bar 22, dependent upon the orbital position of the tine bar. The cam 28 is fixed in relation to the reel rotational axis 101 by the cam support structure 26 while the followers 29 orbit with the reel and follow the cam contours. The cam structure 26 is conventionally connected to the reel support 50 in a manner positioning the cam support laterally adjacent to the reel support arm. Using such a configuration in a center-mounted cam and reel support location requires approximately 8 inches of lateral space. This unfortunately creates an 8 inch wide gap in the tine reel leaving in the incoming standing crop unguided as it enters the header. See FIG. 4.

In the present invention, the cam support 26 includes a support bearing for the reel axle generally centrally positioned and a connection for a modified reel support 30 generally positioned at the periphery of the cam. By modifying the reel support arm for connection to the cam structure and moving the tine reel support bearing from the support arm to the cam support, the reel support 30 and the cam/cam support structure may be configured to fit within the same lateral space rather than in a laterally adjacent arrangement. This configuration when used in a center-mounted cam and reel support reduces the space required (tine reel dead space) from approximately 8 inches to approximately 2 inches.

Referring specifically to FIGS. 2 and 3, the reel 20 and cam structure 26 are connected to the header structure 19 by a reel support 30. The reel support 30 includes a first member 31 pivotally connected to the header structure at pivot 312 and configured to allow generally vertical positioning of the reel 20 by means of lift actuator 32. Pivot 312 is arranged generally parallel to the reel axis 101. While pivoting movement provides a small amount of fore-aft movement of the reel axis 101, the position of the pivot 312 generally behind and beneath the reel axis results in predominately vertical movement of the reel axis as the first member 31 is pivoted. A second member 34 interacting with the first member 31 through a sliding interface 342 is connected at one end to the cam structure 26. The end opposite of the cam structure connection 37 of the second member 34 engages the sliding interface 342 which allows the second member to be positioned along a sliding axis 103 by reach actuator 36. The orientation of the sliding axis 103 is orthogonal to the reel axis and may vary from horizontal depending on the pivoting position of the first member 31. As a result, a small amount of vertical displacement may accompany the fore-aft movement by sliding the second member; however, fore and aft movement is the predominate movement afforded by the sliding interface 342. Movement of the second member 34 allows the fore-aft position of the tine reel 20 in relation to the cutterbar to be adjusted for optimal performance.

Referring to FIG. 4, the present reel support 30 invention is shown disposed in an intermediate position on a header. The tine reel 20 comprises two portions, right 20R and left 20L, respectively. Compared to a conventional tine reel support that would occupy a prohibitively large lateral space in the middle of the tine reel and lead to crop flow problems, the present invention minimizes the lateral space "W" necessary for the reel support arm 30 and cams 28R, 28L. Headers having a single tine reel may also benefit as the space requirements for a reel support arm and cam disposed at one end of the reel are similarly reduced thereby allowing the width of the non-crop processing portion of the header ends to be reduced accordingly.

Referring specifically to FIGS. 3 and 4, one embodiment is shown in which the cam support 26 is intermediately positioned in a split tine reel, the shared cam support 26 including two cams 28L, 28R, two followers 29R, 29L, and two linkages 27R, 27L, one mechanism for each tine reel portion 20L, 20R. This configuration provides the maximum benefit of the present invention as the lateral width necessary to locate the tine bar cam and linkage is minimized and the outboard supports 50 can be configured for minimal lateral width resulting in the minimum dead space across the entirety of the header width. Moreover, the shared cam support 26 reduces the weight of the cam assembly compared to two complete cam and cam support structures without reducing structural capability.

Figure 5:
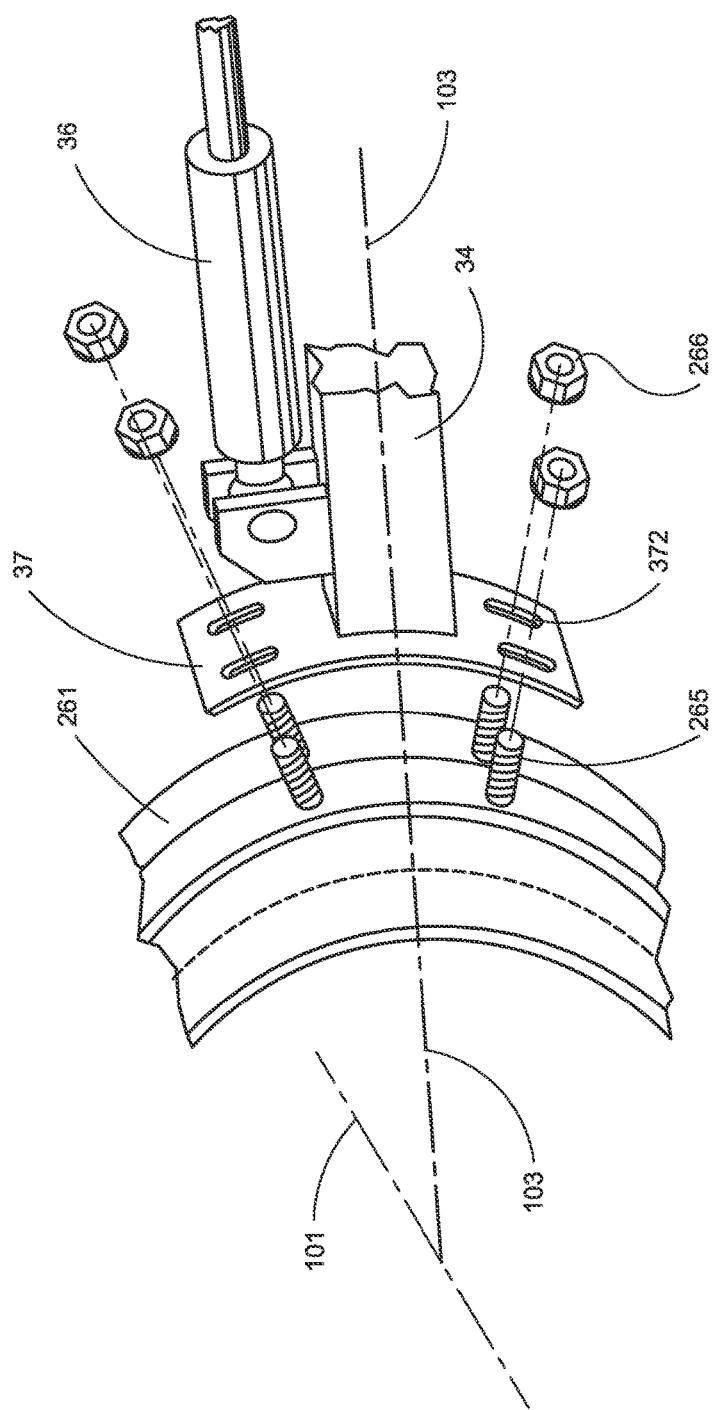
FIG. 5 is an exploded detail view of the cam and reel arm connection of the present invention.

It is advantageous to provide means to adjust the cam position relative to an angular reference position 110, shown as range B in FIG. 2. This adjustment enables cam timing to be finitely adjusted to further optimize reel performance. Referring to FIG. 5, the cam structure connection 37 of present invention includes a plurality of slotted openings 372 that engage bolts 265 on the peripheral surface 261 of the cam structure 26. The slotted openings 372 are oriented to allow finite movement of the cam structure 26 about the tine reel axis 101 thereby enabling cam time adjustment. Once the desired cam timing is established, nut 266 engaging the bolts 265 secure the cam structure 26 to the cam structure connector 37. In split reel designs, the timing of both cams may be adjusted simultaneously.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A tine reel support for an agricultural crop cutting header, the header having a first rotary tine reel arranged for rotation about a transverse rotational axis, the first tine reel having a plurality of tine bars arranged generally parallel to the rotational axis, each tine bar being pivotable by action of a cam follower connected thereto, the tine reel support comprising:
   a cam support structure having a cam oriented in a plane generally perpendicular to the rotational axis and a cam support width extending along the rotational axis, the cam having a curved surface for guiding the cam follower as the tine reel rotates, the cam being outwardly bounded by a peripheral end;
   a bearing support connected to the cam support structure generally in the plane of the cam for rotatably supporting the first tine reel; and
   a reel support arm having generally opposing proximal and distal ends, the proximal end for being connected to the header, an end of the distal end connected to the peripheral end and extending generally rearwardly therefrom and being laterally bounded by a pair of parallel planes spaced apart by the cam support width,
   wherein the support arm is for being movably connected to the header and a first actuator is provided to move the support arm and enable the rotational axis to be moved in a generally vertical direction.

2. The tine reel support of claim 1, wherein the support arm connection to the header is a pivoting connection allowing pivotal movement of the support arm about a pivot axis generally parallel to the rotational axis.

3. The tine reel support of claim 1, wherein the support arm further comprises a first portion, a second portion, and a second actuator, the first portion for being connected to the header at the proximal end, the second portion directly connected to the peripheral end at the distal end, the first and second portions being relatively moveable, movement of the second portion by the second actuator causing movement of the rotational axis in a generally fore-aft direction relative to the header.

4. The tine reel support of claim 3, wherein the first portion includes a receiver to slideably receive the second portion and allow movement thereof along a longitudinal sliding axis, the sliding axis being orthogonally oriented to the rotational axis.

5. The tine reel support of claim 2, wherein the header further includes a second tine reel positioned for rotation on the rotational axis on an opposite side of the cam support structure from the first tine reel, and the cam support structure further includes a second cam laterally facing the second tine reel to control movement of tine bars thereon.

6. A tine reel support for an agricultural crop cutting header, the header having a first rotary tine reel arranged for rotation about a transverse rotational axis, the first tine reel having a plurality of tine bars arranged generally parallel to the rotational axis, each tine bar being pivotable by action of a cam follower connected thereto, the tine reel support comprising:
   a cam support structure having a cam oriented in a plane generally perpendicular to the rotational axis and a cam support width extending along the rotational axis, the cam having a curved surface for guiding the cam follower as the tine reel rotates, the cam being outwardly bounded by a peripheral end;
   a bearing support connected to the cam support structure generally in the plane of the cam for rotatably supporting the first tine reel; and
   a reel support arm having generally opposing proximal and distal ends, the proximal end for being connected to the header, an end of the distal end connected to the peripheral end and extending generally rearwardly therefrom and being laterally bounded by a pair of parallel planes spaced apart by the cam support width,
   wherein the connection between the distal end of the support arm and a peripheral end of the cam support structure allows finite selective movement of the cam support structure about an axis parallel to the rotational axis.

7. A tine reel support for an agricultural crop cutting header, the header having a pair of rotary tine reels adjacently arranged for simultaneous rotation about a transverse rotational axis, the tine reel support comprising:
   a cam support structure having a pair of curved cams oriented in a plane generally perpendicular to the rotational axis with a cam support width extending along the rotational axis, the cams being outwardly bounded by a peripheral end and disposed between the adjacent tine reels;
   a bearing support connected to the cam support structure generally in the plane of the cam for rotatably supporting the tine reels; and
   a reel support arm having generally opposing proximal and distal ends, the proximal end for being connected to the header, an end of the distal end connected to the peripheral end and extending generally rearwardly therefrom and being laterally bounded by a pair of parallel planes spaced apart by the cam support width, wherein the support arm is for being movably connected to the header and a first actuator is provided to move the support arm and enable the rotational axis to be moved in a generally vertical direction.

8. The tine reel support of claim 7, wherein the support arm connection to the header is a pivoting connection allowing pivotal movement of the support arm about a pivot axis generally parallel to the rotational axis.

9. The tine reel support of claim 7, wherein the support arm further comprises a first portion, a second portion, and a second actuator, the first portion for being connected to the header at the proximal end, the second portion directly connected to the peripheral end at the distal end, the first and second portions being relatively moveable, movement of the second portion by the second actuator causing movement of the rotational axis in a generally fore-aft direction relative to the header.

10. The tine reel support of claim 9, wherein the first portion includes a receiver to slideably receive the second portion and allow movement thereof along a longitudinal sliding axis, the sliding axis being orthogonally oriented to the rotational axis.

11. The tine reel support of claim 7, wherein the connection between the distal end of the support arm and a peripheral end of the cam support structure allows finite selective movement of the cam support structure about an axis parallel to the rotational axis.

12. A header for an agricultural machine, the header comprising:
a header structure;
a plurality of cam followers;
a first rotary tine reel arranged for rotation about a transverse rotational axis, the first rotary tine reel comprising a plurality of tine bars arranged generally parallel to the rotational axis, each tine bar being pivotable by action of a respective one of the plurality of cam followers connected thereto; and
a tine reel support comprising:
a cam support structure comprising a cam oriented in a plane generally perpendicular to the rotational axis and having a cam support width extending along the rotational axis, the cam having a curved surface for guiding the plurality of cam followers as the first rotary tine reel rotates, the cam support structure having a peripheral end;
a bearing support connected to the cam support structure generally in a plane of the cam for rotatably supporting the first rotary tine reel; and
a reel support arm having generally opposing proximal and distal ends, the proximal end connected to the header structure, an end of the distal end being directly connected to the peripheral end of the cam support structure and extending generally rearwardly therefrom and being laterally bounded by a pair of parallel planes spaced apart by the cam support width,
wherein the reel support arm is movably connected to the header structure, and wherein the tine reel support further comprises a first actuator for moving the reel support arm to move the rotational axis in a generally vertical direction.

13. The header of claim 12, wherein the reel support arm connection to the header structure is a pivoting connection allowing pivotal movement of the reel support arm about a pivot axis generally parallel to the rotational axis.

14. The header of claim 12, wherein the reel support arm further comprises a first portion, a second portion, and a second actuator, the first portion connected to the header structure at the proximal end, the second portion connected to the peripheral end of the cam support structure at the distal end, the first and second portions being relatively moveable, movement of the second portion by the second actuator causing movement of the rotational axis in a generally fore-aft direction relative to the header structure.

15. The header of claim 14, wherein the first portion includes a receiver to slideably receive the second portion and allow movement thereof along a longitudinal sliding axis, the sliding axis being orthogonally oriented relative to the rotational axis.

16. The header of claim 12, further comprising a second rotary tine reel positioned for rotation on the rotational axis on an opposite side of the cam support structure from the first rotary tine reel, the second rotary tine reel comprising a further plurality of tine bars arranged generally parallel to the rotational axis, wherein the cam support structure further comprises a second cam laterally facing the second rotary tine reel to control movement of the further plurality of tine bars thereon.

17. A header for an agricultural machine, the header comprising:
a header structure;
a plurality of cam followers;
a first rotary tine reel arranged for rotation about a transverse rotational axis, the first rotary tine reel comprising a plurality of tine bars arranged generally parallel to the rotational axis, each tine bar being pivotable by action of a respective one of the plurality of cam followers connected thereto; and
a tine reel support comprising:
a cam support structure comprising a cam oriented in a plane generally perpendicular to the rotational axis and having a cam support width extending along the rotational axis, the cam having a curved surface for guiding the plurality of cam followers as the first rotary tine reel rotates, the cam support structure having a peripheral end;
a bearing support connected to the cam support structure generally in a plane of the cam for rotatably supporting the first rotary tine reel; and
a reel support arm having generally opposing proximal and distal ends, the proximal end connected to the header structure, an end of the distal end being directly connected to the peripheral end of the cam support structure and extending generally rearwardly therefrom and being laterally bounded by a pair of parallel planes spaced apart by the cam support width,
wherein the connection between the distal end of the support arm and the peripheral end of the cam support structure allows selective movement of the cam support structure about an axis parallel to the rotational axis.

* * * * *